United States Patent Office 3,297,904
Patented Jan. 10, 1967

3,297,904
ARC LAMP INTENSITY CONTROL SYSTEM
Carl Lauxen, Haddonfield, N.J., assignor to the United States of America as represented by the Secretary of the Air Force
Filed Nov. 19, 1963, Ser. No. 324,900
4 Claims. (Cl. 314—63)

This invention relates to a system for automatically controlling the output intensity level of a carbon arc lamp and is more particularly concerned with providing a means by which the output of an arc lamp can be controlled to produce only the required light energy by regulating the flow of current in the arc flame and thereby controlling the intensity and output energy of the arc lamp.

One of the most difficult problems regarding the use of arc lamps as a constant light energy source is the variations in output intensity caused by carbon impurities or fluctuations of input voltage and current values. It is well known that the level of current flow across the arc gap is determined by the length of the gap and therefore control of the position of the electrodes will control the current flow and consequently the intensity level of the arc lamp output. A constant light intensity output may be achieved by maintaining the current flow across the arc gap at a constant level regardless of the burning rate of the electrodes thereby providing an energy source which is accurately controlled and constant.

Accordingly, it is an object of the present invention to provide an improved light energy source wherein the output intensity of the arc lamp is maintained at a constant level.

Another object of the invention is to provide an arc lamp wherein the arc current is maintained at a constant level by controlling the length of the arc gap.

A further object of the invention is to provide an arc lamp control system in which the energy level at the target area is used to control the electrode position and current flow in the arc flame.

A still further object of the invention is to provide an arc lamp wherein a pyrometer or thermopile device is utilized to convert the output energy from the arc lamp into a D.C. voltage for comparison with a stable reference voltage.

Another still further object of the invention is to provide an arc lamp intensity control system wherein any difference or error between the light energy at the target and a reference based on a calibrated equivalent energy is amplified and fed into a phase control type of servo motor which functions as an electrode drive motor for positioning one electrode relative to the other.

Figure 1:
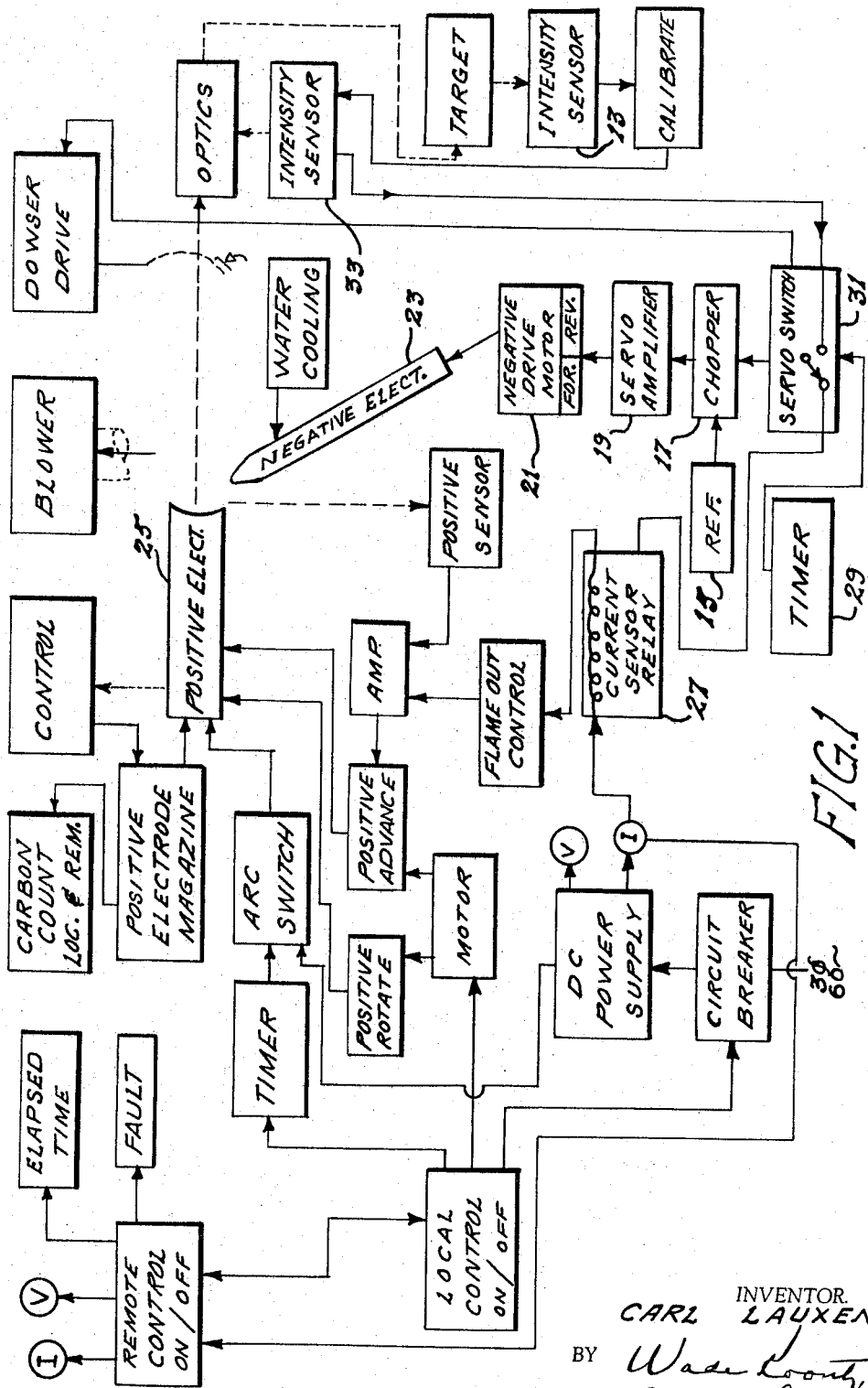
Figure 2:
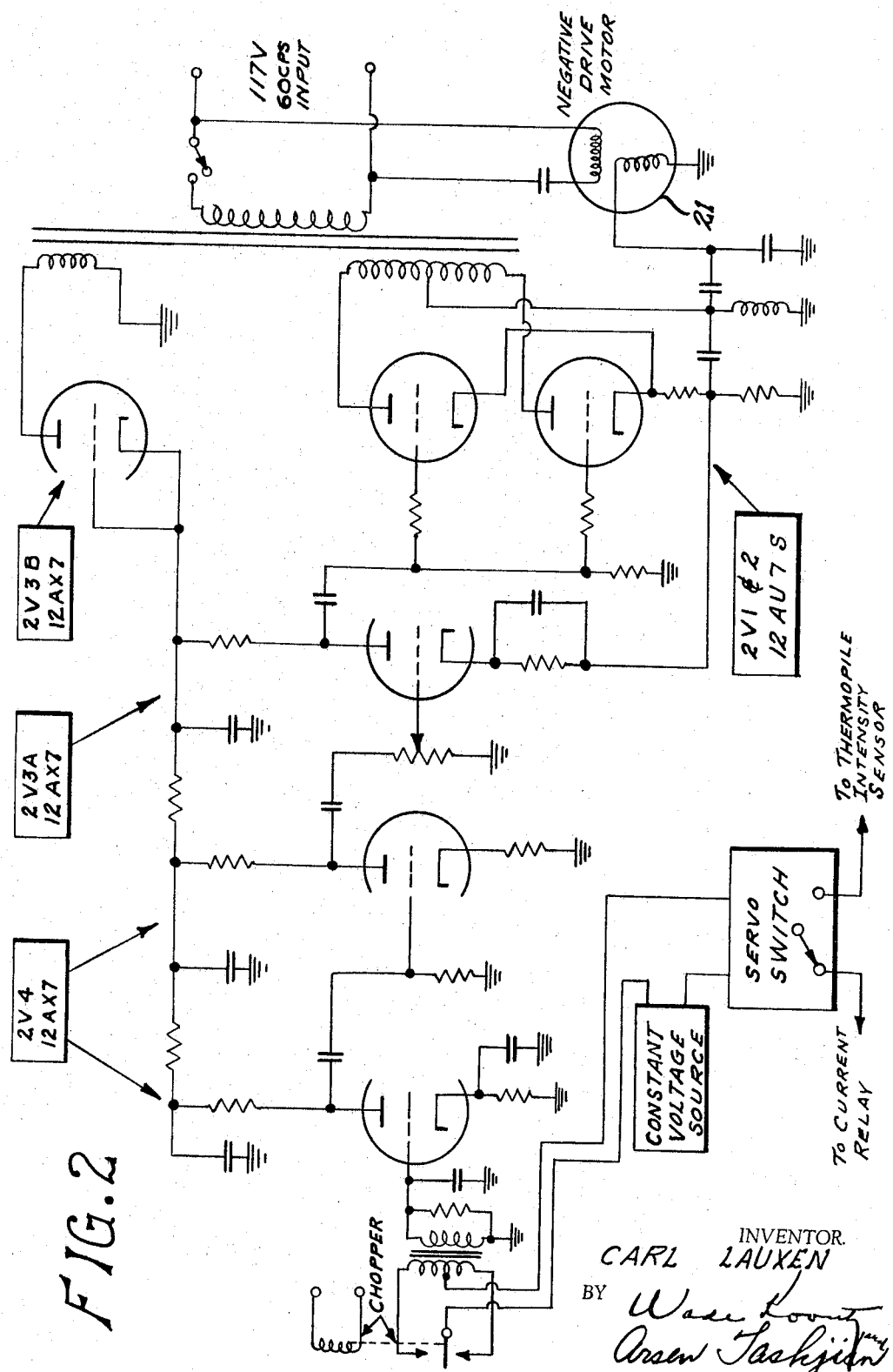

These and other objects, features, and advantages will become more apparent after considering the following detailed description taken in connection with the illustrative embodiment in the accompanying drawings wherein:

FIG. 1 is a block diagram of the intensity control system and includes other pertinent portions of the automatic continuous burning arc lamp; and FIG. 2 is a schematic diagram of the servo amplifier and electrode drive motor showing the various stages of amplification and connections with the two phase induction negative drive motor.

Referring now to FIGURE 1, there is shown a block diagram of the intensity control system and its relationship to the other elements of the automatic continuous burning arc lamp. As indicated in FIGURE 1, the operation of the system is predicated on the basis that the light energy output of a carbon arc lamp is a direct function of the current flow in the arc flame. The light energy measured in the target area by the intensity sensor 13 is used to control the arc current by comparing the output wattage of the lamp with a reference energy source 15 using a reed type chopper 17 and amplifying the difference or error signal in the servo amplifier 19. The amplified error signal is then used to control the speed and direction of the negative electrode drive motor 21 which in turn sets the negative electrode 23 in the proper position so that the arc lamp will carry the amount of current necessary in order to emit the desired light intensity.

The intensity sensor 13 consists of a pyrometer or thermopile which incorporates a number of thermocouples essentially connected in series to provide D.C. voltage higher than would be made available from a single thermocouple. The pyrometer utilizes a sapphire rod as a light guide which is exposed to illumination at one end. The light is reflected through the rod and focused on the pyrometer hot junctions. The output of the pyrometer is a low level D.C. voltage which, when set up under laboratory conditions to simulated illumination of 130 watts per square foot, measures 0.3 millivolt.

The reference source 15 has as its primary element a Zener diode reference voltage supply which is extremely stable. A measuring circuit or comparator including a chopper 17 consists of a balanced bridge which when properly adjusted at normal illumination, has zero output. Excursions of the pyrometer output, due to changes in illumination, produce either a positive or negative voltage at the output of the measuring circuit. This signal is fed to a reed type of chopper which converts the signal to a 60 cycles per second square wave signal whose amplitude is a linear function of the error signal amplitude.

The resultant 60 cycles per second signal from the chopper 17 is fed through the servo amplifier 19 which includes three stages of voltage amplification and one stage of push-pull power amplification. A schematic diagram of this section of the intensity servo is shown in FIGURE 2. The output of the power amplifier is connected to one phase of the two phase indication negative drive motor 21, the other phase being connected directly to the 60 cycles per second line. The phase relationship between the control and line phase, whether 90 degrees leading or 90 degrees lagging, will be determined by the polarity of the error. The amplitude of the control phase voltage will depend upon the completion of the error signal. The two phase motor closes the servo loop by driving the negative electrode 23 either forward or backward thus restoring the illumination level to the correct value.

The block diagram of FIGURE 1 shows additional elements which provide for automatic striking of the arc and a current control system timed to allow for flame stabilization. Although these last-mentioned systems are known in the art, their interaction with the previously described measuring circuit will be better understood when considered with the following description of the operation of certain other phases of the intensity control system.

Automatic stroke is attained upon first energizing the electrodes 23 and 25. A current relay 27 sensing a no-current condition activates a circuit energizing the negative drive motor 21 causing the negative electrode 23 to advance. The electrode continues to advance until contact is made with the positive electrode 25. This situation, known as a strike, permits maximum current to flow which is recognized by the current relay 27. The relay immediately reverses the negative drive motor 21 to withdraw the negative electrode 23 thus completing the strike mode.

The current relay 27 is adjusted to a predetermined current approximately equivalent to the operating current level. At this current the armature of the relay hovers between the motor advance and retract contacts rendering the motor inactive and indicating that the negative electrode is positioned such that the desired arc current is flowing. A timer 29 permits the arc to burn in this current controlled mode until the arc lamp has warmed up and the flame becomes stable. The timer 29 then operates to shift the servo switch 31 from the position whereby the negative electrode motor input is received from the current control relay 27 to the position whereby the output of the intensity sensor 33 feeds into the negative drive motor 21. Thus the servo motor may operate on either current servo information or intensity servo information depending on the mode selected by the servo switch 31. Should the arc flame be extinguished for any reason, the system resets itself to first strike the arc, then operates by current control and finally by intensity control.

In a typical embodiment of the invention where it is desired to deliver to a taregt a light energy of 130 watts per square foot of area, a control system of the type described would operate within a range of plus or minus 5 percent. The pyrometer or thermopile measures the light energy at the target and compares this measurement with a reference based on 130 watts per square foot. Any difference or error is amplified and used with the phase control type of servo motor that is directly coupled to the negative electrode providing the drive necessary to position this electrode with respect to the positive electrode. The gap between these electrodes determines the current flowing in the arc flame, a small gap causing a higher current to flow and a longer gap drawing less current. The negative electrode drive motor not only controls the arc gap length but also advances the electrode at the consumption rate.

Another means for controlling the light energy output of an arc lamp in the target area is to provide a variable iris in the optical system of the lamp. However, the use of an iris implies that more energy than required must be generated in order that a certain amount be metered off by the iris. This raises the additional problem of absorption of the excess energy by water cooling or some other dissipation arrangement. On the other hand, the novel intensity control system herein disclosed generates only the amount of light energy required at the target area, thereby producing a more efficient, accurate, and dependable system than any previously known in the art.

It will be understood by those skilled in the art that the invention has been described with reference to a particular embodiment and that various changes and modifications may be made in the device without departing from the true spirit and scope of the invention.

Having thus described my invention, what I claim as new and desire to secure by Letters Patent of the United States is:

1. Apparatus for controlling the output of light energy from an arc lamp having a pair of electrodes comprising, means for passing a current through the electrodes to form an arc therebetween, motor means operatively connected to each of said electrodes for moving said electrodes relative to one another to maintain a fixed distance therebetween, sensing means in the target area of said arc lamps for detecting the total light energy output therefrom and converting said total light energy to electrical energy, a Zener diode controlled voltage source for supplying a stable reference voltage, comparator means for comparing the electrical energy from said arc lamp with the stable reference voltage, the output of said comparator means being an error signal indicating the deviation from normal intensity of said arc lamp, and amplifying means for increasing the amplitude of the error signal from said comparator means, one of said motor means being directly coupled to one of said electrodes and responsive to the output of said amplifying means to advance and retract said electrode at a relatively faster rate when the light energy output as determined by said sensing means varies from normal, thereby varying the distance between the electrodes resulting in a corresponding variation in the light intensity and energy output of said arc lamp.

2. The apparatus defined in claim 1 wherein the sensing means for detecting the light energy output of said arc lamp comprises a sapphire rod disposed in the path of light from said arc lamp, and a plurality of series connected thermocouples having active junction portions for converting light and heat energy from said arc lamp to electrical energy, said sapphire rod serving to focus said light energy on to the active junction portions of said thermocouples.

3. The apparatus defined in claim 1 wherein the comparator means for comparing the electrical energy from said arc lamp with a stable reference voltage includes a balanced bridge circuit adjusted to produce zero output at normal light intensity of said arc lamp, said bridge circuit becoming unbalanced and producing an output voltage when the light intensity of the arc lamp deviates from the normal as indicated by said sensing means, a reed type chopper for converting the bridge unbalance voltage to a sixty cycle square wave signal, the amplitude of said square wave signal being proportional to the deviation from normal intensity of said arc lamp thereby producing an error signal, said error signal being the output of said comparator means operatively connected to the input of said amplifying means.

4. A method of maintaining substantially uniform light energy output in an arc lamp having motor driven electrodes comprising the steps of measuring the light energy output of said arc lamp at the target area, comparing the arc lamp output light energy with a Zener diode controlled reference voltage based on normal light intensity, determining the difference between output light intensity of said arc lamp and said reference voltage, amplifying the difference to obtain an error signal, feeding the error signal into a phase control type drive motor operatively connected to one of said electrodes, and varying the gap between the electrodes of said arc lamp by changing the feed rate of one electrode according to the variation in intensity as determined by said error signal to return said arc lamp to normal output conditions.

References Cited by the Examiner

UNITED STATES PATENTS

| | | | |
|---|---|---|---|
| 1,959,654 | 5/1934 | Berg | 315—155 X |
| 2,813,237 | 11/1957 | Fluegel et al. | 318—29 |
| 2,911,577 | 11/1959 | Pignone | 318—29 |
| 3,162,045 | 12/1964 | Kudelko | 88—22 |
| 3,236,997 | 2/1966 | Johnson et al. | 314—63 X |

OTHER REFERENCES

Silicon Zener Diode Handbook, 1959, Motorola Inc., page 29.

JOSEPH V. TRUHE, *Primary Examiner.*